US010352679B2

(12) United States Patent
Tobiason (10) Patent No.: US 10,352,679 B2
(45) Date of Patent: Jul. 16, 2019

(54) COMPACT COORDINATE MEASUREMENT MACHINE CONFIGURATION WITH LARGE WORKING VOLUME RELATIVE TO SIZE (71) Applicant: Mitutoyo Corporation, Kanagawa-ken (JP)

(72) Inventor: Joseph Daniel Tobiason, Bothell, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 140 days.

(21) Appl. No.: 15/476,385

(22) Filed: Mar. 31, 2017

(65) Prior Publication Data
US 2018/0283840 A1 Oct. 4, 2018

(51) Int. Cl.
*G01B 5/008* (2006.01)
*G01B 5/00* (2006.01)
*G01B 5/004* (2006.01)

(52) U.S. Cl.
CPC .......... *G01B 5/008* (2013.01); *G01B 5/0004* (2013.01); *G01B 5/004* (2013.01); *G01B 2210/54* (2013.01); *G01B 2210/58* (2013.01)

(58) Field of Classification Search
CPC .... G01B 5/008; G01B 5/0002; G01B 5/0004; G01B 5/004; G01B 2210/56; G01B 2210/58; G01B 5/201; G01B 5/02; G01B 5/061; G01B 21/042
USPC .................. 33/503, 549, 551, 553, 554, 555
See application file for complete search history.

(56) References Cited

U.S. PATENT DOCUMENTS

| 3,499,227 | A | * | 3/1970 | Krause | G01B 7/285 33/552 |
| 3,813,789 | A | | 6/1974 | Shelton | |
| 4,166,323 | A | * | 9/1979 | Maag | G01B 7/283 33/501.9 |
| 4,807,152 | A | * | 2/1989 | Lane | G01B 7/008 318/578 |

(Continued)

FOREIGN PATENT DOCUMENTS

DE 100 19 962 A1 3/2001

OTHER PUBLICATIONS

Extended European Search Report, dated Jun. 6, 2018, for European Application No. 18165219.9-1022, 11 pages.

*Primary Examiner* — Christopher W Fulton
(74) *Attorney, Agent, or Firm* — Seed IP Law Group LLP (57) ABSTRACT A compact portable coordinate measuring machine (CMM) with a large working volume for measuring workpieces is provided. The CMM includes a vertical support, a workpiece stage and a movement configuration that provides relative motion between a measurement probe and a workpiece. The movement configuration includes a vertical translation mechanism with a vertical translation element that couples to a vertical guide and moves over a vertical translation range. The workpiece stage is located above a top end of the vertical support and at least a majority of the vertical guide and the vertical translation range is located below a top end of the workpiece stage. In various implementations, the movement configuration may also include a rotary motion configuration and a horizontal translation mechanism. A controller controls the movement configuration to provide relative motion between the measurement probe and a workpiece that is located in the working volume on the workpiece stage.

15 Claims, 6 Drawing Sheets

(56) References Cited

U.S. PATENT DOCUMENTS

| | | | |
|---|---|---|---|
| 5,402,582 A | 4/1995 | Raab | |
| 5,758,429 A | 6/1998 | Farzan et al. | |
| 6,487,785 B1 | 12/2002 | Ritz | |
| 6,745,616 B1* | 6/2004 | Katayama | G01B 5/0004 33/551 |
| 6,971,183 B2 | 12/2005 | Brenner et al. | |
| 7,290,348 B2* | 11/2007 | Katamachi | G01B 5/0016 33/550 |
| 7,587,834 B2 | 9/2009 | Eaton | |
| 7,591,078 B2 | 9/2009 | Crampton | |
| 7,636,646 B2* | 12/2009 | Kojima | G01B 21/045 33/503 |
| 7,652,275 B2 | 1/2010 | Gladnick | |
| 8,191,274 B2 | 6/2012 | Eaton | |
| 8,250,772 B2 | 8/2012 | Eaton | |
| 8,438,746 B2 | 5/2013 | Usui | |
| 8,453,339 B2 | 6/2013 | Eaton | |
| 2001/0008047 A1* | 7/2001 | Okada | G01B 5/008 33/503 |
| 2001/0008994 A1* | 7/2001 | Omori | B23Q 17/20 702/95 |
| 2002/0000047 A1* | 1/2002 | Yoda | G05B 19/401 33/503 |
| 2004/0200085 A1* | 10/2004 | Sakata | G01B 7/12 33/550 |
| 2005/0132591 A1* | 6/2005 | Kojima | G01B 5/08 33/503 |
| 2010/0077627 A1 | 4/2010 | Iwai | |
| 2010/0299104 A1 | 11/2010 | Tamai et al. | |
| 2012/0084989 A1* | 4/2012 | Pettersson | G01B 21/045 33/503 |
| 2013/0047452 A1* | 2/2013 | McMurtry | G01B 5/0016 33/503 |
| 2015/0323300 A1 | 11/2015 | Briegel et al. | |
| 2016/0161250 A1 | 6/2016 | Nakamura | |

* cited by examiner

COMPACT COORDINATE MEASUREMENT MACHINE CONFIGURATION WITH LARGE WORKING VOLUME RELATIVE TO SIZE

BACKGROUND

Technical Field

This disclosure relates to precision metrology, and more particularly to coordinate measuring machines with movement mechanisms that move measurement probes for measuring workpieces.

Description of the Related Art

Coordinate measurement machines (CMMs) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. CMMs employing mechanical contact probes are also described in U.S. Pat. Nos. 6,971,183 and 6,487,785, which are hereby incorporated herein by reference in their entirety. A CMM including a surface scanning probe is described in U.S. Pat. No. 7,652,275, which is hereby incorporated herein by reference in its entirety. As disclosed therein, a scanning probe such as a mechanical contact probe or a non-contact optical probe may scan across the workpiece surface. In various CMMs which employ scanning probes, measurement synchronization trigger signals trigger measurements from CMM scales or encoders (e.g., linear and rotary scales or encoders) that track an overall position and orientation of the scanning probe (e.g., its base position) in the machine coordinate system, as well as triggering a local surface measurement from the scanning probe. The scanning probe measurement is in a local coordinate system that is referenced to (or measured relative to) the scanning probe base.

Many prior CMM systems are relatively large, and are not easily moved to new locations (e.g., for being moved from location to location for temporarily performing measurements of workpieces, etc.) A portable CMM is described in U.S. Pat. No. 8,191,274, which is hereby incorporated herein by reference in its entirety. As disclosed therein, the portable CMM includes a housing rotatively supported on a base and mounting a vertical pillar along which rides a carriage engaged by a horizontally translating arm. While the disclosed CMM is portable, the working volume in which a workpiece to be measured may be located is limited to the spacing between the vertical pillar and the fully extended length of the horizontally translating arm. A compact portable CMM configuration with a larger working volume relative to its size, and other improved features, would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A compact portable coordinate measuring machine (CMM) with a large working volume (relative to its size) for measuring workpieces is provided. In various implementations, the CMM includes a vertical support, a workpiece stage, a movement configuration and a controller. The vertical support extends along a vertical axis direction and has a vertical support length, and includes a fixed base portion. The workpiece stage is coupled to the vertical support and is located above a top end of the vertical support. A workpiece that is to be inspected may be located in a working volume on the workpiece stage and above the top end of the vertical support.

The movement configuration is coupled to the vertical support and provides relative motion between a measurement probe and the workpiece in order to inspect the workpiece that is located in the working volume on the workpiece stage and above the top end of the vertical support. The movement configuration includes a vertical translation mechanism with a vertical translation element that couples to a vertical guide through a vertical coupling portion and moves parallel to the vertical guide over a vertical translation range. In various implementations, at least a majority of the vertical guide and the vertical translation range is located below a top end of the workpiece stage. The controller controls the movement configuration to provide the relative motion between the measurement probe and a workpiece that is located in the working volume on the workpiece stage.

DETAILED DESCRIPTION

Figure 1:
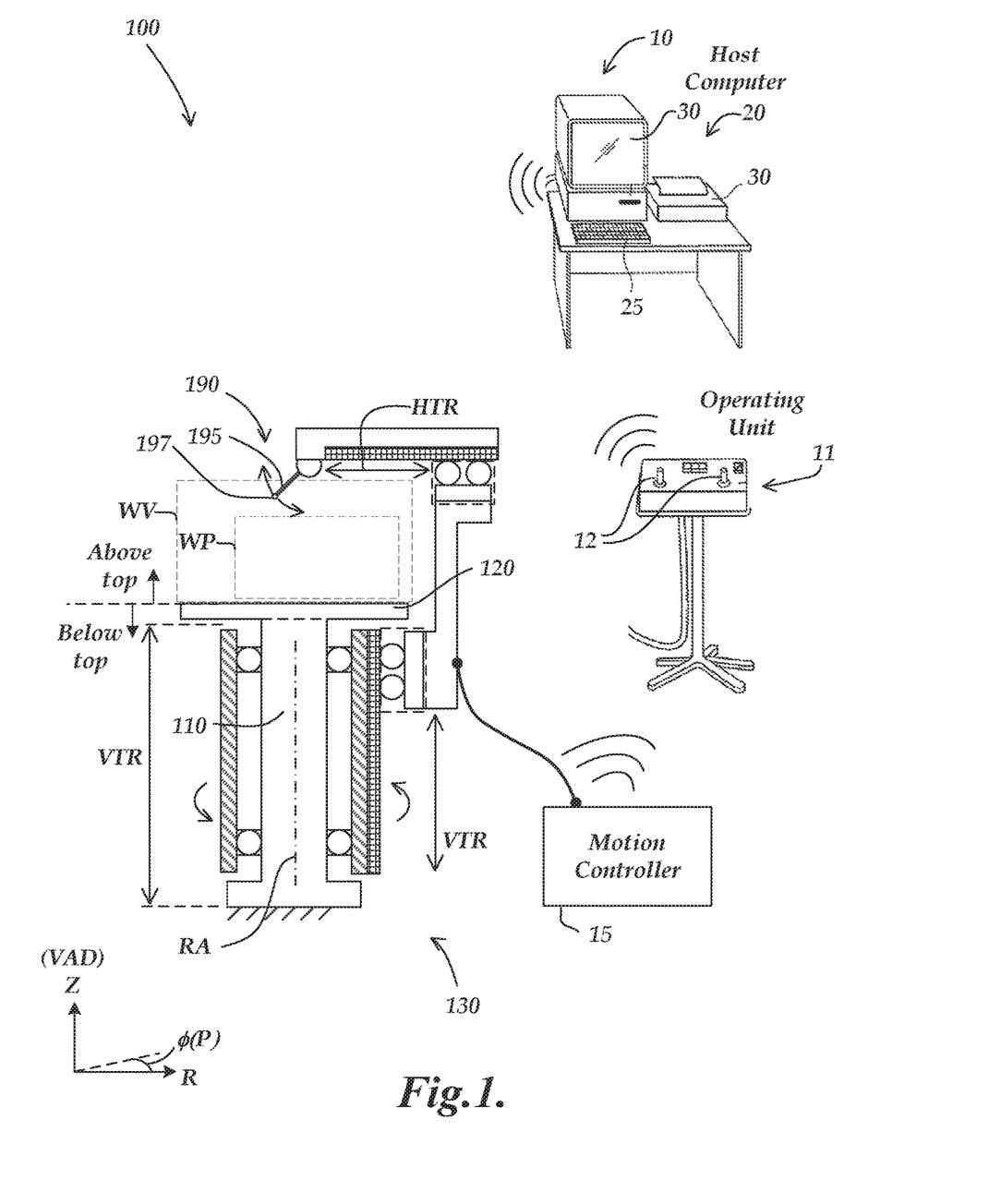
FIG. 1 is a diagram showing various components of a measuring system including a CMM such as that disclosed herein.

FIG. 1 is a diagram showing various components of a measuring system 10 including a CMM 100 such as that disclosed herein. The measuring system 10 includes an operating unit 11, a motion controller 15 that controls movements of the CMM 100, a host computer 20 and the CMM 100. In various implementations, the operating unit 11, motion controller 15, host computer 20 and/or CMM 100 may each be interconnected by wired and/or wireless connections. The operating unit 11 is coupled (e.g., through a wireless connection) to the motion controller 15 and may include joysticks 12 and/or other user interface components and/or features for enabling a user to manually operate the CMM 100.

The host computer 20 is coupled (e.g., through a wireless connection) to the motion controller 15 and operates the CMM 100 and processes measurement data for a workpiece WP according to known methods. In various implementations, the host computer 20 may process measurement data received from the motion controller 15 as indicating measurement coordinates for a plurality of surface points on the workpiece (e.g., for determining a surface profile and/or other characteristics of the surface of the workpiece, etc.)

The host computer 20 includes input components 25 (e.g., a keyboard, etc.) for inputting, for example, measurement conditions, and output components 30 (e.g., a display, printer, etc.) for outputting, for example, measurement results. It will be appreciated that in various implementations the operating unit 11, motion controller 15, host computer 20 and/or CMM 100 may each be merged with and/or otherwise made to include the functions of one another. For example, in various implementations the CMM 100 may include the operating unit 11, motion controller 15 and/or host computer 20. As another example, in various implementations the motion controller 15 may be merged with the operating unit 11 and/or host computer 20 in a single device (e.g., in a tablet computer, etc.).

As will be described in more detail below with respect to FIGS. 3-6, in various implementations the CMM 100 may include a vertical support 110, a workpiece stage 120, and a movement configuration 130 that provides relative motion between a measurement probe 195 and a workpiece WP that is to be measured. The measurement probe 195 includes a contact portion 197. In various implementations, a probe head configuration 190 and/or other probe operating components allow the measurement probe 195 to deflect when its contact portion 197 contacts the surface of the workpiece W, to produce a touch trigger signal. The characteristics and operations of commercially available CMMs in this regard are generally known in the art, and are therefore not described in greater detail herein. As one example of a contact detector that may be utilized with a touch probe, an exemplary implementation of a high speed contact detector is disclosed in US Pat. Appl. Publ. No. 2015/0323300, to Briegel et al., which is hereby incorporated herein by reference in its entirety.

Figure 2:
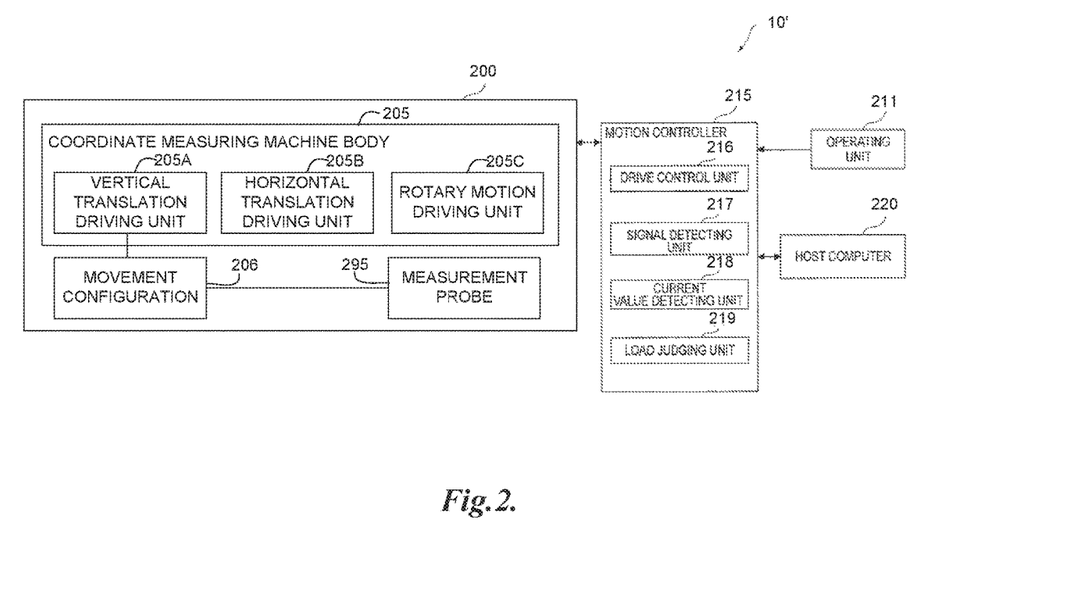
FIG. 2 is a block diagram showing various control elements of a measuring system including a CMM such as that of FIG. 1.

FIG. 2 is a block diagram showing various control elements of a measuring system 10' that is similar to the measuring system 10 of FIG. 1. As shown in FIG. 2, the measuring system 10' includes a CMM 200, a motion controller 215, an operating unit 211 and a host computer 220. The CMM 200 includes a drive mechanisms portion 205, a movement configuration 206 and a measurement probe 295. The drive mechanisms portion 205 includes a vertical translation driving unit 205A, a horizontal translation driving unit 205B and a rotary motion driving unit 205C.

As will be described in more detail below with respect to FIGS. 3-6, each of the driving units 205A, 205B and 205C may correspond to and control the motion of a related mechanism of the movement configuration 206. For example, the vertical translation driving unit 205A may correspond to and control the motion of a vertical translation mechanism of the movement configuration 206. The horizontal translation driving unit 205B may correspond to and control the motion of a horizontal translation mechanism of the movement configuration 206. The rotary motion driving unit 205C may correspond to and control the motion of a rotary motion configuration of the movement configuration 206. The movement configuration 206 correspondingly provides relative motion between the measurement probe 295 and a workpiece that is being measured. In various implementations, each of the driving units 205A, 205B and 205C may include various sensors (e.g., encoders, etc.) for outputting a signal in accordance with the relative displacement of the associated components of the movement configuration 206.

As shown in FIG. 2, the motion controller 215 includes a drive control unit 216, a signal detecting unit 217, a current value detecting unit 218 and a load judging unit 219. The drive control unit 216 controls the driving units 205A, 205B and 205C of the drive mechanisms portion 205 (e.g., in accordance with commands from the operating unit 211 and/or host computer 220, etc.) The signal detecting unit 217 detects the signal output by the sensors provided as part of the driving units 205A, 205B and 205C of the drive mechanisms portion 205. Such sensor signals may be indicative of the displacement of certain related elements (e.g., the displacement of a vertical translation element, a horizontal translation element, one or more rotary motion mechanisms, etc., as will be described in more detail below with respect to FIGS. 3-6). In various implementations, the signals representing the various displacements are output to the host computer 220 for determining coordinates and/or measurement values for various points on the surface of the workpiece that is being measured.

The current value detecting unit 218 detects a current value for moving the measurement probe 295 by the movement configuration 206. The load judging unit 219 judges the load applied on the movement configuration 206 based on the current value detected by the current value detecting unit 218 and the threshold that is set in accordance with the target speed for moving the measurement probe 295 by the movement configuration 206. In various implementations, the target speed for moving the measurement probe 295 by the movement configuration 206 may be calculated by the motion controller 215 based on commands from the operating unit 211 and/or the host computer 220. The host computer 220 includes a CPU (Central Processing Unit), a memory and the like. The host computer 220 outputs a predetermined command to the motion controller 215 to control the CMM 200 to control the movement configuration 206 to move a contact portion of the measurement probe 295 along a surface of a workpiece that is being measured (e.g., for measuring a surface profile of the workpiece, etc.)

In various implementations, each of the CMM 200, operating unit 211, motion controller 215, and/or host computer 220 may comprise or consist of any computing system or device, and/or distributed computing environment, and may include one or more processors that execute software to perform the functions described herein. Processors include programmable general- or special-purpose microprocessors, controllers, application-specific integrated circuits (ASICs), programmable logic devices (PLDs), or a combination thereof. Software may be stored in random-access memory (RAM), read-only memory (ROM), flash memory, or the like, or a combination thereof. Software may also be stored in optical-based disks, flash memory devices, or any other type of non-volatile storage medium for storing data. Software may include one or more program modules that include routines, programs, objects, components, data structures, and so on that perform particular tasks or implement particular abstract data types. In various implementations, the software may include computer-executable instructions stored on one or more computer readable media that, when executed by one or more processors, perform the recited operations. The functionality of the program modules may be combined or distributed across multiple computing systems or devices and accessed via service calls, either in a wired or wireless configuration.

Figure 3:
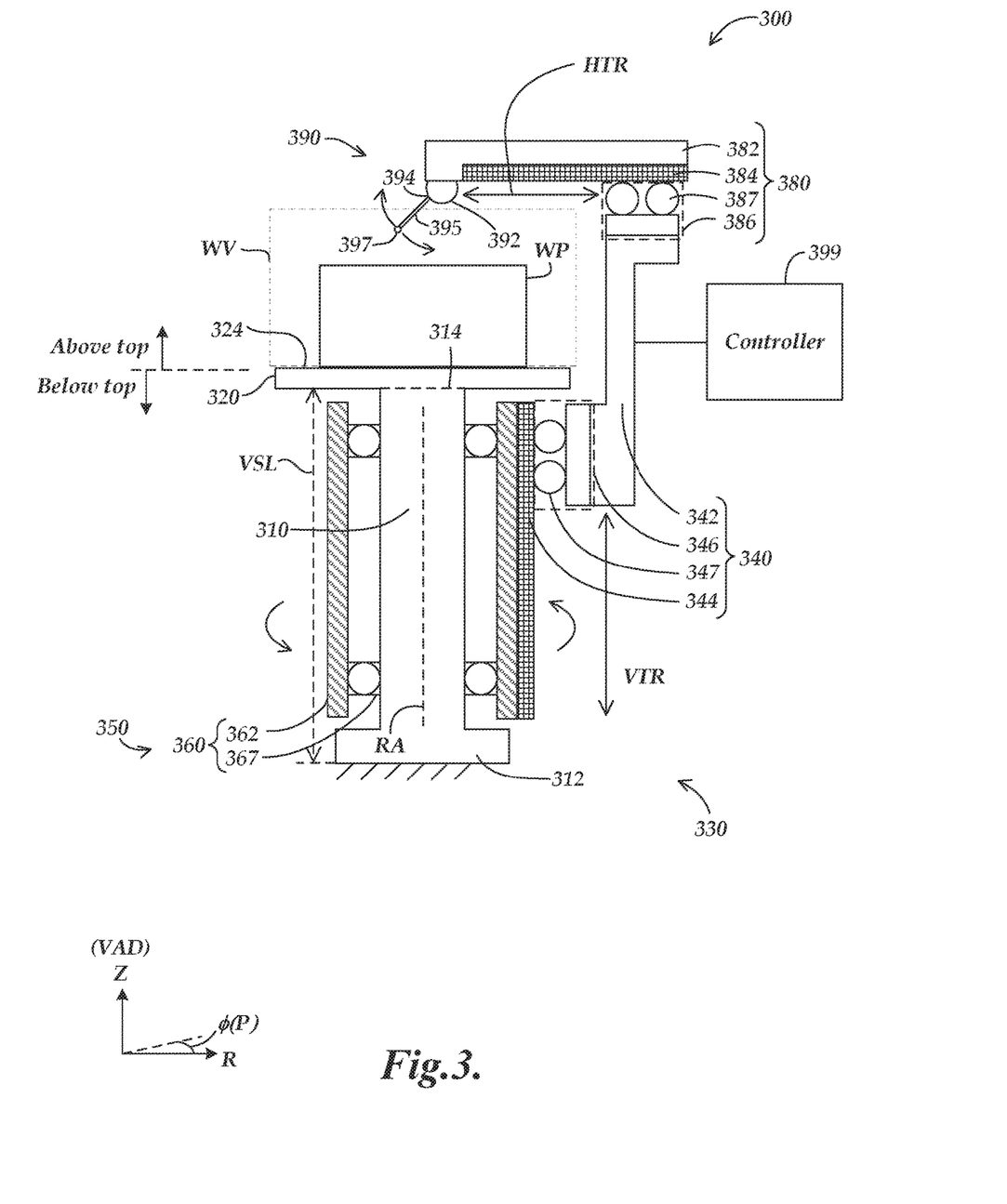
FIG. 3 is a diagram of a CMM including a first exemplary implementation of a movement configuration.

FIG. 3 is a diagram of a CMM 300 including a first exemplary implementation of a movement configuration 330. In various implementations, the CMM 300 includes a vertical support 310, a workpiece stage 320, the movement configuration 330, a measurement probe 395 and a controller 399. The movement configuration 330 includes a vertical translation mechanism 340, a rotary motion configuration 350, a horizontal translation mechanism 380 and a probe head configuration 390. As shown in FIG. 3, the vertical support 310 extends along a vertical axis direction VAD and has a vertical support length VSL, and includes a fixed base portion 312. The workpiece stage 320 is coupled to the vertical support 310 and is located above a top end 314 of the vertical support 310.

In various implementations, a workpiece WP that is to be inspected may be located in a working volume WV on the workpiece stage 320 and above the top end 314 of the vertical support 310. In various implementations, the movement configuration 330 is configured such that a workpiece WP may be located anywhere within the working volume WV, and an outer dimension of the vertical support 310 over at least a majority of its vertical support length VSL is less than, and included within, a projection of a diameter of the working volume WV along the vertical axis direction VAD. In various implementations, the movement configuration 330 may be configured to provide the relative motion between the measurement probe 395 and the workpiece WP at least around a perimeter of the workpiece WP that is located in the working volume WV on the workpiece stage 320.

The movement configuration 330 is coupled to the vertical support 310 and provides relative motion between the measurement probe 395 and the workpiece WP in order to inspect the workpiece WP. As noted above, the workpiece WP may be located in the working volume WV on the workpiece stage 320 and above the top end 314 of the vertical support 310. The vertical translation mechanism 340 of the movement configuration 330 includes a vertical translation element 342 that couples to a vertical guide 344 through a vertical coupling portion 346 and moves parallel to the vertical guide 344 over a vertical translation range VTR.

In various implementations, at least a majority of the vertical guide 344 and the vertical translation range VTR is located below a top end 324 of the workpiece stage 320. In various implementations, at least a majority of the vertical guide 344 and the vertical translation range VTR overlaps with the vertical support length VSL of the vertical support 310 along the vertical axis direction VAD. In various implementations, the vertical coupling portion 346 may include one or more vertical couplings 347 (e.g., as part of a carriage type mechanism for moving along the vertical guide 344). In various implementations, the vertical couplings 347 may consist of bearing type elements that are constrained to roll within and along the vertical guide 344. In various implementations, the vertical guide 344 may include a vertical slot through which the vertical translation element 342 extends and which guides the vertical translation element 342 as it moves along the vertical translation range VTR.

In various implementations, the rotary motion configuration 350 of the movement configuration 330 includes a first rotary motion mechanism 360 that is coupled to the vertical support 310 below the workpiece stage 320. The first rotary motion mechanism 360 is configured to couple to the vertical guide 344 and rotate the vertical guide 344 around the vertical support 310, wherein the vertical guide 344 is rotated about a rotation axis RA that is approximately parallel to the vertical axis direction VAD. In various implementations, the first rotary motion mechanism 360 includes a first rotary element 362 that couples to the vertical guide 344 and one or more rotary couplings 367 that are coupled between the first rotary element 362 and the vertical support 310. In various implementations, the rotary couplings 367 may consist of bearing type elements that are constrained to roll between the first rotary element 362 and the vertical support 310, so as to enable the first rotary element 362 to rotate around the vertical support 310 and to correspondingly rotate around the rotation axis RA. In various implementations, the vertical support 310, workpiece stage 320 and working volume WV are at least approximately centered relative to the rotation axis RA that extends along the vertical axis direction VAD.

In various implementations, the configuration of FIG. 3 and other configurations herein (e.g., the configurations of FIGS. 4-6 as will be described in more detail below) may be arranged according to cylindrical coordinates Z, R and $\phi$ which are aligned with the rotation axis RA, wherein Z corresponds to the axial direction (e.g., corresponding to the vertical axis direction VAD) and $\phi$ (or "P") corresponds to the circumferential direction around the rotation axis RA. It will be appreciated that in other implementations other types of Cartesian coordinates or other coordinates may also or alternatively be utilized with respect to determining the coordinates of measured points on the surface of the workpiece WP. In the configuration of FIG. 3, the workpiece stage 320 is attached to the vertical support 310 and does not rotate relative to the vertical support 310. As will be described in more detail below with respect to FIGS. 4-6, in alternative implementations the workpiece stage 320 may be configured to rotate relative to the vertical support 310.

In various implementations, the horizontal translation mechanism 380 of the movement configuration 330 includes a horizontal translation element 382, a horizontal guide 384 and a horizontal coupling portion 386. The horizontal coupling portion 386 moves parallel to the horizontal guide 384 over a horizontal translation range HTR. In various implementations, the horizontal coupling portion 386 may include one or more horizontal couplings 387 (e.g., as part of a carriage type mechanism for moving along the horizontal guide 384). In various implementations, the horizontal couplings 387 may consist of bearing type elements that are constrained to roll within and along the horizontal guide 384.

The horizontal translation element 382 is coupled to the vertical translation element 342 through the horizontal coupling portion 386 and the horizontal guide 384. The horizontal translation element 382 is located above the top end 324 of the workpiece stage 320. It will be appreciated that the references herein with respect to being "above" or "below" various components (e.g., above the top end 324 of the workpiece stage 320) are with respect to position along the vertical axis direction VAD, but do not necessarily indicate a vertical alignment between the referenced components (e.g., the horizontal translation element 382 is above the top end 324 of the workpiece stage 320 in terms of the relative positions along the vertical axis direction VAD, but in certain configurations may be off to the side of and thus not vertically aligned with the workpiece stage 320, etc.).

In various implementations, the probe head configuration 390 of the movement configuration 330 includes an articulated probe head 392 providing at least one rotational degree of freedom. The articulated probe head 392 includes a probe coupling portion 394 that couples to the measurement probe 395, such that the measurement probe 395 is attached through the articulated probe head 392 to the horizontal translation element 382 and the contact portion 397 of the measurement probe 395 may be extended toward the workpiece WP. In various implementations, the articulated probe head 392 is coupled indirectly (e.g., through the horizontal translation element 382) to the vertical translation element 342 and translates vertically by the same amount as the vertical translation element 342. As will be described in more detail below with respect to FIG. 6, in an alternative implementation the articulated probe head 392 may be coupled directly to the vertical translation element 342. In various implementations, a controller 399 (e.g., the motion controller 15 of FIGS. 1 and 2) is included as part of the CMM 300 and controls the movement configuration 330 to provide the relative motion between the measurement probe 395 and a workpiece WP that is located in the working volume WV on the workpiece stage 320. In various implementations, the contact portion 397 of the measurement probe 395 may be maneuvered by the movement configuration 330 to contact and correspondingly measure the locations of points on the surface of the workpiece WP.

Figure 4:
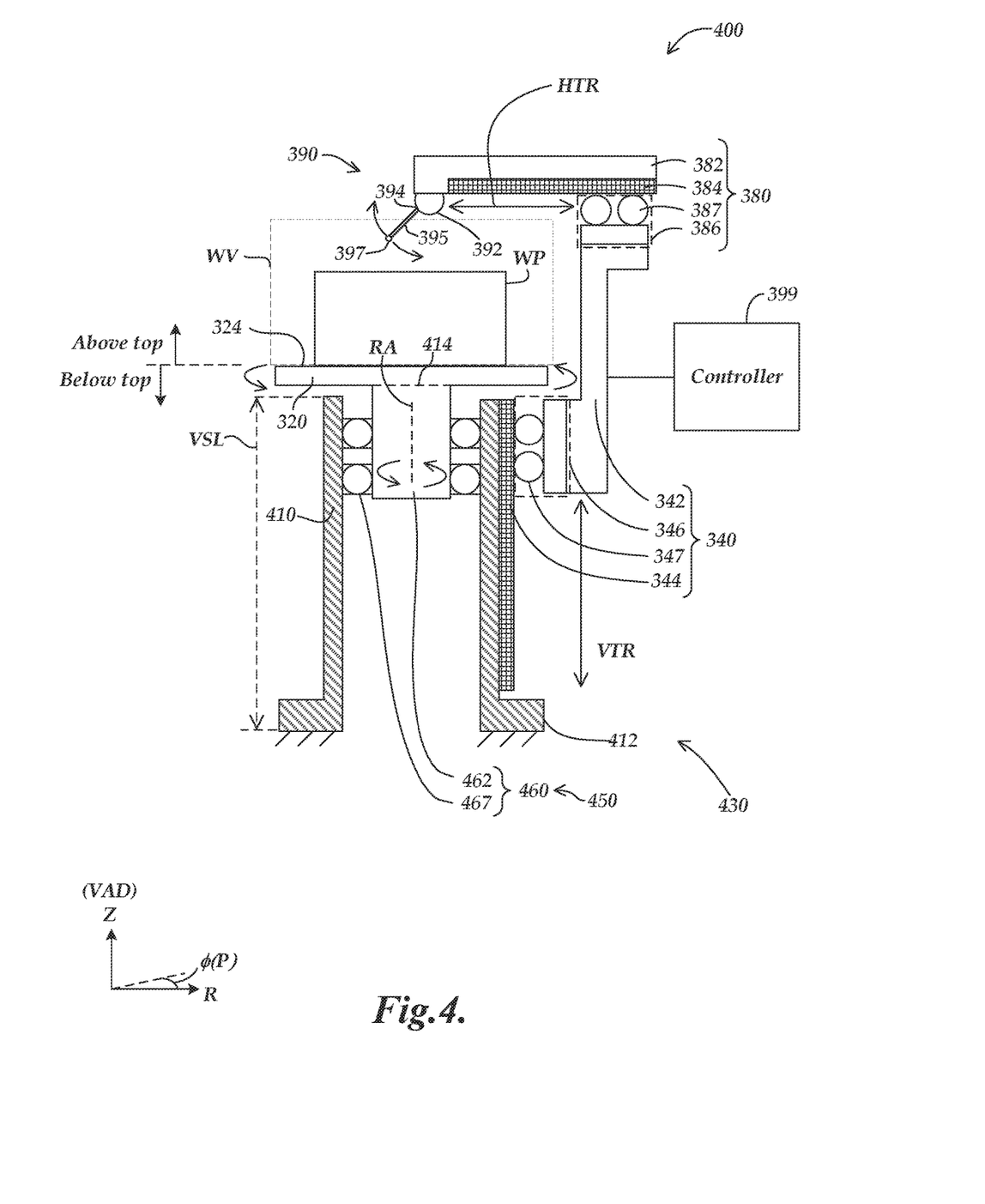
FIG. 4 is a diagram of a CMM including a second exemplary implementation of a movement configuration.

FIG. 4 is a diagram of a CMM 400 including a second exemplary implementation of a movement configuration 430. The CMM 400 has certain similarities to the CMM 300 of FIG. 3, and similarly numbered components will be understood to operate similarly, except as otherwise described below. With respect to certain differences from the CMM 300, the CMM 400 includes different implementations of a vertical support 410 and a rotary motion mechanism 460 of a rotary motion configuration 450, as will be described in more detail below. Accordingly, the CMM 400 includes the vertical support 410, the workpiece stage 320, the movement configuration 430, the measurement probe 395 and the controller 399. The movement configuration 430 includes the vertical translation mechanism 340, the rotary motion configuration 450, the horizontal translation mechanism 380 and the probe head configuration 390.

As shown in FIG. 4, the vertical support 410 extends along a vertical axis direction VAD and has a vertical support length VSL, and includes a fixed base portion 412. The rotary motion configuration 450 of the movement configuration 430 includes the first rotary motion mechanism 460 that is coupled to the vertical support 410 below the workpiece stage 320 and is configured to couple to and rotate the workpiece stage 320 relative to the vertical support 410. The workpiece stage 320 is rotated about a rotation axis RA that is approximately parallel to the vertical axis direction VAD.

In various implementations, the first rotary motion mechanism 460 includes a first rotary element 462 that couples to the workpiece stage 320 and one or more rotary couplings 467 that are coupled between the first rotary element 462 and the vertical support 410. In various implementations, the rotary couplings 467 may consist of bearing type elements that are constrained to roll between the first rotary element 462 and the vertical support 410, so as to enable the first rotary element 462 to rotate within the vertical support 410 and to correspondingly rotate around the rotation axis RA. In various implementations, the vertical support 410, workpiece stage 320 and working volume WV are at least approximately centered relative to the rotation axis RA that extends along the vertical axis direction VAD. The vertical guide 344 is attached to the vertical support 410 and does not rotate relative to the vertical support 410.

Figure 5:
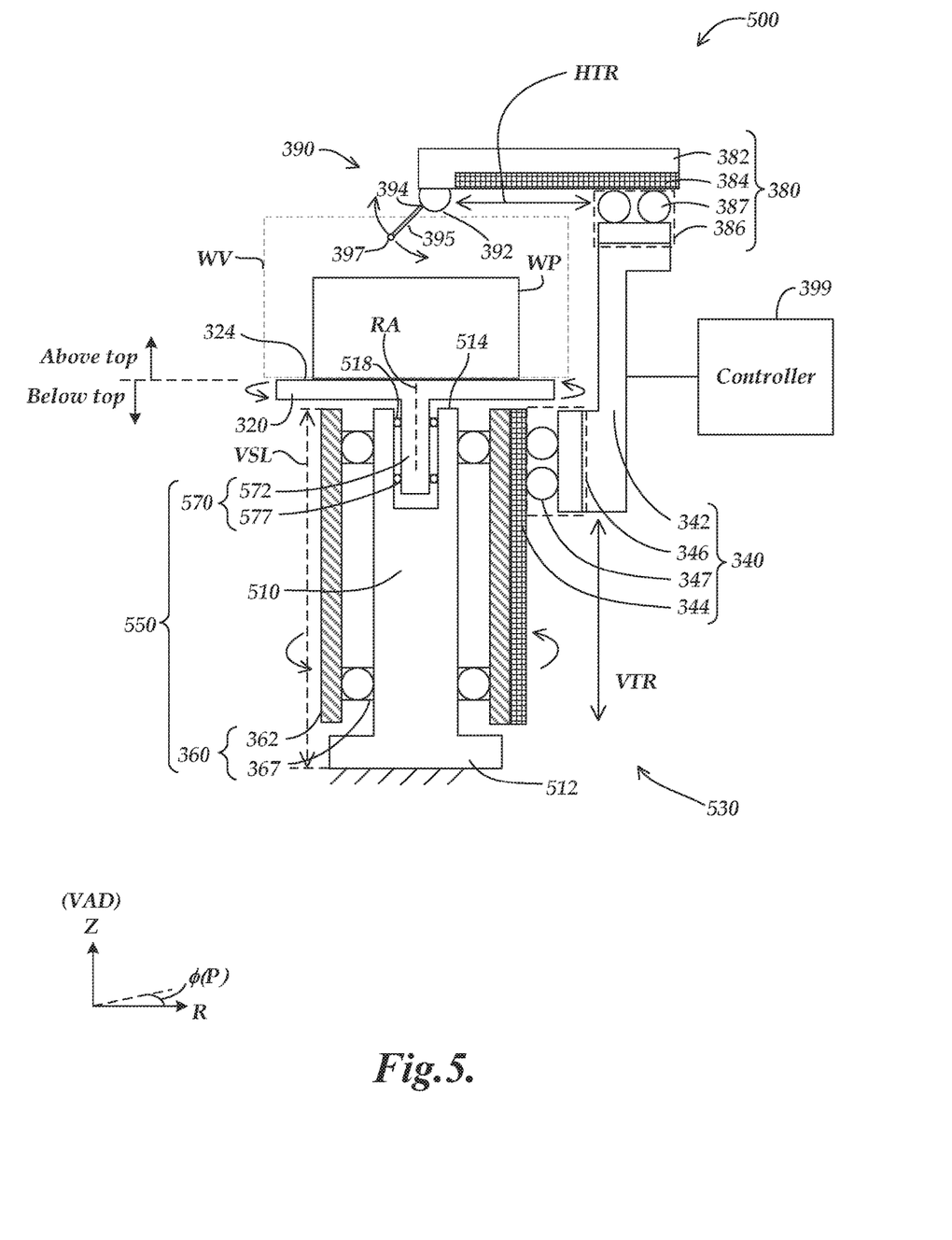
FIG. 5 is a diagram of a CMM including a third exemplary implementation of a movement configuration.

FIG. 5 is a diagram of a CMM 500 including a third exemplary implementation of a movement configuration 530. The CMM 500 has certain similarities to the CMMs 300 and 400, and similarly numbered components will be understood to operate similarly, except as otherwise described below. With respect to certain differences from the CMM 300, the CMM 500 includes different implementations of a vertical support 510 and a rotary motion configuration 550, as will be described in more detail below. Accordingly, the CMM 500 includes the vertical support 510, the workpiece stage 320, the movement configuration 530, the measurement probe 395 and the controller 399. The movement configuration 530 includes the vertical translation mechanism 340, the rotary motion configuration 550, the horizontal translation mechanism 380 and the probe head configuration 390.

As shown in FIG. 5, the vertical support 510 extends along a vertical axis direction VAD and has a vertical support length VSL, and includes a fixed base portion 512. The vertical support 510 also includes a receiving area 518 in which a second rotary motion mechanism 570 of the rotary motion configuration 550 is located. More specifically, in addition to the first rotary motion mechanism 360, the rotary motion configuration 550 further includes a second rotary motion mechanism 570. The second rotary motion mechanism 570 is coupled to the vertical support 510 below the workpiece stage 320 and is configured to couple to and rotate the workpiece stage 320 relative to the vertical support 510, wherein the workpiece stage 320 is rotated about the rotation axis RA that is approximately parallel to the vertical axis direction VAD.

In various implementations, the second rotary motion mechanism 570 includes a second rotary element 572 that couples to the workpiece stage 320 and one or more rotary couplings 577 that are coupled between the second rotary element 572 and the vertical support 510. In various implementations, the rotary couplings 577 may consist of bearing type elements that are constrained to roll between the second rotary element 572 and the vertical support 510 (i.e., within the receiving area 518 of the vertical support 510), so as to enable the second rotary element 572 to rotate within the receiving area 518 of the vertical support 510 and to correspondingly rotate around the rotation axis RA. It will be appreciated that in various implementations the first rotary motion mechanism 360 and the second rotary motion mechanism 570 may have different capabilities and associated characteristics (e.g., related to rotational mass, inertia, stability, maximum speed of rotation, etc.) such that greater flexibility is provided by having both mechanisms in the CMM 500 to be utilized depending on the needs/desired characteristics for a particular measurement procedure.

Figure 6:
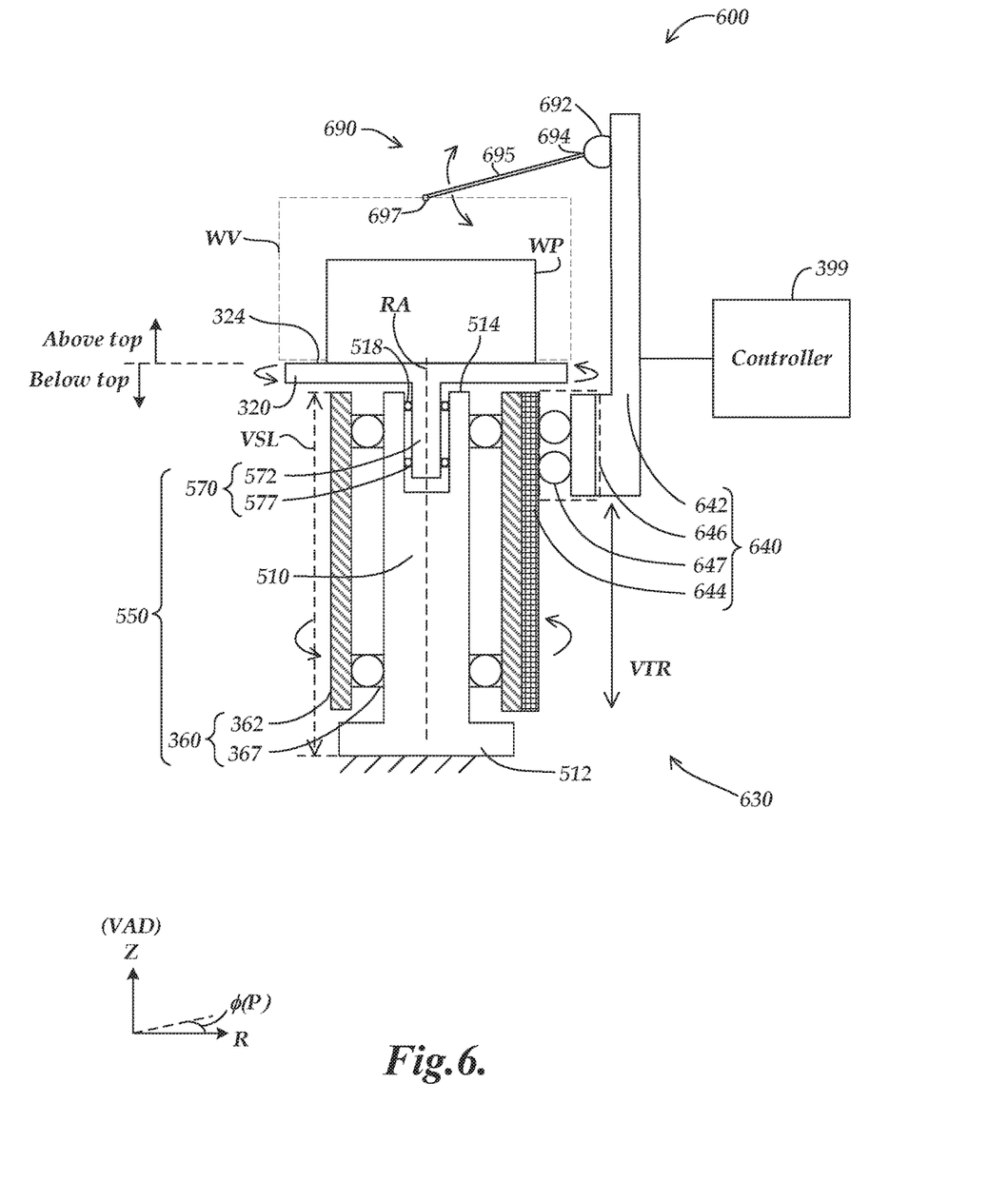
FIG. 6 is a diagram of a CMM including a fourth exemplary implementation of a movement configuration.

FIG. 6 is a diagram of a CMM 600 including a fourth exemplary implementation of a movement configuration 630. The CMM 600 has certain similarities to the CMMs 300, 400 and 500, and similarly numbered components will be understood to operate similarly, except as otherwise described below. With respect to certain differences from the CMM 500, the CMM 600 includes different implementations of a vertical translation mechanism 640 and a probe head configuration 690, and does not include a horizontal translation mechanism 380, as will be described in more detail below. Accordingly, the CMM 600 includes the vertical support 510, the workpiece stage 320, the movement configuration 630, the measurement probe 695 and the controller 399. The movement configuration 630 includes the vertical translation mechanism 640, the rotary motion configuration 550 and the probe head configuration 690.

As shown in FIG. 6, the vertical translation mechanism 640 includes a vertical translation element 642 that couples to a vertical guide 644 through a vertical coupling portion 646 and moves parallel to the vertical guide 644 over a vertical translation range VTR. As noted above, the movement configuration 630 does not include a horizontal translation mechanism. Instead, an articulated probe head 692 of the probe head configuration 690 is coupled directly to the vertical translation element 642 and translates vertically by the same amount as the vertical translation element 642. In various implementations, the probe head configuration 690 of the movement configuration 630 includes the articulated probe head 692 providing at least one rotational degree of freedom. The articulated probe head 692 includes a probe coupling portion 694 that couples to the measurement probe 695, such that the measurement probe 695 is attached through the articulated probe head 692 to the vertical translation element 642, and the contact portion 697 of the measurement probe 695 may be extended toward a surface of the workpiece WP for performing measurements.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A coordinate measuring machine, comprising:
   a vertical support extending along a vertical axis direction and having a vertical support length, the vertical support including a fixed base portion;
   a workpiece stage that is coupled to the vertical support and that is located above a top end of the vertical support, wherein a workpiece that is to be inspected may be located in a working volume on the workpiece stage and above the top end of the vertical support;
   a movement configuration that is coupled to the vertical support and that provides relative motion between a measurement probe and the workpiece that is located in the working volume on the workpiece stage and above the top end of the vertical support in order to inspect the workpiece, the movement configuration including:
      a vertical translation mechanism, comprising a vertical translation element that couples to a vertical guide through a vertical coupling portion and moves parallel to the vertical guide over a vertical translation range, wherein at least a majority of the vertical guide and the vertical translation range is located below a top end of the workpiece stage, and
      a rotary motion configuration comprising a first rotary motion mechanism that is coupled to the vertical support below the workpiece stage and configured to couple to and rotate the vertical guide around the vertical support about a rotation axis approximately parallel to the vertical axis direction; and
   a controller that controls the movement configuration to provide the relative motion between the measurement probe and a workpiece that is located in the working volume on the workpiece stage.

2. The coordinate measuring machine of claim 1, wherein the workpiece stage is attached to the vertical support and does not rotate relative to the vertical support.

3. The coordinate measuring machine of claim 1, wherein the rotary motion configuration further comprises a second rotary motion mechanism that is coupled to the vertical support below the workpiece stage and configured to couple to and rotate the workpiece stage relative to the vertical support.

4. The coordinate measuring machine of claim 1, wherein the movement configuration further includes a horizontal translation mechanism comprising a horizontal translation element, a horizontal guide and a horizontal coupling portion that moves parallel to the horizontal guide over a horizontal translation range, wherein the horizontal translation element is coupled to the vertical translation element through the horizontal coupling portion and the horizontal guide.

5. The coordinate measuring machine of claim 4, wherein the measuring probe is attached to the horizontal translation element.

6. The coordinate measuring machine of claim 4, wherein the horizontal translation element is located above the top end of the workpiece stage.

7. The coordinate measuring machine of claim 1, wherein the movement configuration further includes a probe head configuration comprising an articulated probe head providing at least one rotational degree of freedom and having a probe coupling portion that couples to the measurement probe, wherein the articulated probe head is coupled directly or indirectly to the vertical translation element and translates vertically by the same amount as the vertical translation element.

8. The coordinate measuring machine of claim 1, wherein the movement configuration is configured to provide the relative motion between the measurement probe and the workpiece at least around a perimeter of the workpiece that is located in the working volume on the workpiece stage.

9. The coordinate measuring machine of claim 1, wherein the vertical support, workpiece stage and working volume are centered relative to a rotation axis that extends along the vertical axis direction.

10. The coordinate measuring machine of claim 1, wherein at least a majority of the vertical guide and the vertical translation range overlaps with the vertical support length of the vertical support.

11. The coordinate measuring machine of claim 1, wherein the movement configuration is configured such that a workpiece may be located anywhere within the working volume, and an outer dimension of the vertical support over at least a majority of its vertical support length is less than, and included within, a projection of a diameter of the working volume along the vertical axis direction.

12. A measuring system, comprising:
   a coordinate measuring machine comprising:
      a vertical support extending along a vertical axis direction and having a vertical support length, the vertical support including a fixed base portion;
      a workpiece stage that is coupled to the vertical support and that is located above a top end of the vertical support, wherein a workpiece that is to be inspected may be located in a working volume on the workpiece stage and above the top end of the vertical support;
      a movement configuration that is coupled to the vertical support and that provides relative motion between a measurement probe and the workpiece that is located in the working volume on the workpiece stage and above the top end of the vertical support in order to inspect the workpiece, the movement configuration including:
   a vertical translation mechanism, comprising a vertical translation element that couples to a vertical guide through a vertical coupling portion and moves parallel to the vertical guide over a vertical translation range, wherein at least a majority of the vertical guide and the vertical translation range is located below a top end of the workpiece stage, and
   a rotary motion configuration comprising a first rotary motion mechanism that is coupled to the vertical support below the workpiece stage and configured to couple to and rotate the vertical guide around the vertical support about a rotation axis approximately parallel to the vertical axis direction; and
a controller comprising:
   one or more processors; and
   a memory coupled to the one or more processors and storing program instructions that when executed by the one or more processors cause the one or more processors to at least:
     control the movement configuration to provide relative motion between the measurement probe and a workpiece that is located in the working volume on the workpiece stage; and
     receive measurement data indicating measurement coordinates for a surface point on the workpiece based on a position of a contact portion of the measurement probe that is in contact with the surface point on the workpiece.

13. The measuring system of claim 12, wherein the movement configuration further includes a horizontal translation mechanism comprising a horizontal translation element, a horizontal guide and a horizontal coupling portion that moves parallel to the horizontal guide over a horizontal translation range, wherein the horizontal translation element is coupled to the vertical translation element through the horizontal coupling portion and the horizontal guide, and the controlling of the movement configuration further comprises controlling the horizontal translation mechanism to move the horizontal translation element parallel to the horizontal guide.

14. The measuring system of claim 12, further comprising a host computer that processes measurement data received from the controller as indicating measurement coordinates for a plurality of surface points on the workpiece.

15. The measuring system of claim 12, further comprising an operating unit that is configured to enable a user to manually operate the coordinate measuring machine.

\* \* \* \* \*